April 14, 1925.

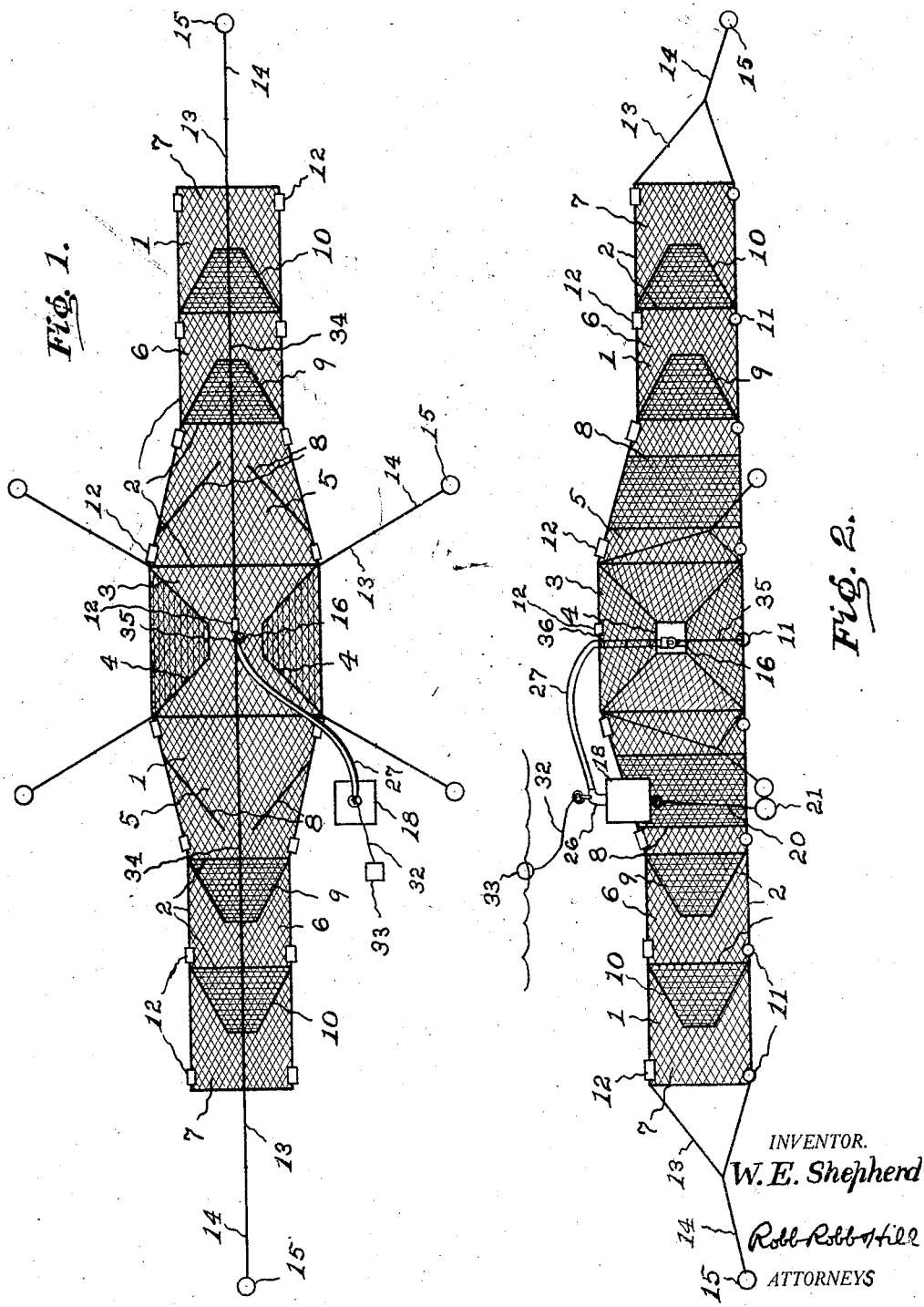

W. E. SHEPHERD 1,533,471

FISHING DEVICE

Filed May 14, 1923

INVENTOR.
W. E. Shepherd
BY
Robb Robb + Hill
ATTORNEYS

Patented Apr. 14, 1925.

1,533,471

UNITED STATES PATENT OFFICE.

WILLIAM E. SHEPHERD, OF HURON, OHIO.

FISHING DEVICE.

Application filed May 14, 1923. Serial No. 638,850.

*To all whom it may concern:*

Be it known that I, WILLIAM E. SHEPHERD, a citizen of the United States, residing at Huron, in the county of Erie and State of Ohio, have invented certain new and useful Improvements in Fishing Devices, of which the following is a specification.

The present invention relates in general to fishing appliances, and more particularly to a fishing trap which embodies novel features of construction, whereby large numbers of fish can be caught with a comparatively small outlay of money for twine, netting and other necessary equipment.

Among the objects of the invention is to provide a fish trap which is comparatively simple and inexpensive in its construction, which can be operated without difficulty, and which provides an effective means for attracting the fish so that they will congregate around the trap, with the result that many of them will be finally caught therein.

With the above and other objects in view the invention consists in certain combinations and arrangements of the parts as will be more fully understood as the description proceeds, the novel features thereof being pointed out in the appended claims.

For a full understanding of the invention reference is to be had to the following description and accompanying drawings in which:

Figure 1 is a top plan view of a fish trap which is constructed in accordance with the invention.

Figure 2 is a side elevation thereof.

Corresponding and like parts are referred to in the following description, and indicated in all of the views of the drawings by like reference characters.

Figure 3:
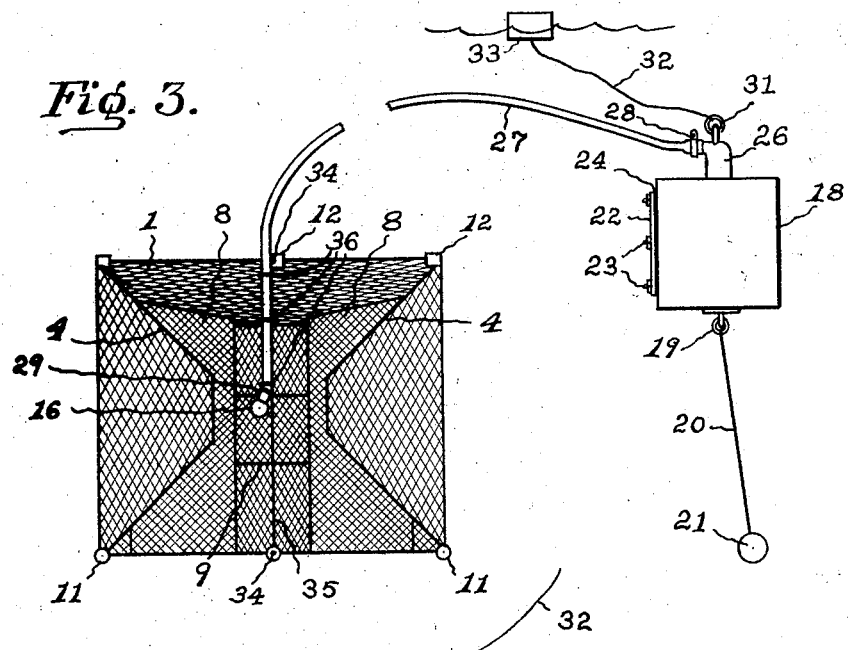
Figure 3 is a transverse sectional view through the middle portion of the fish trap.
Figure 4:
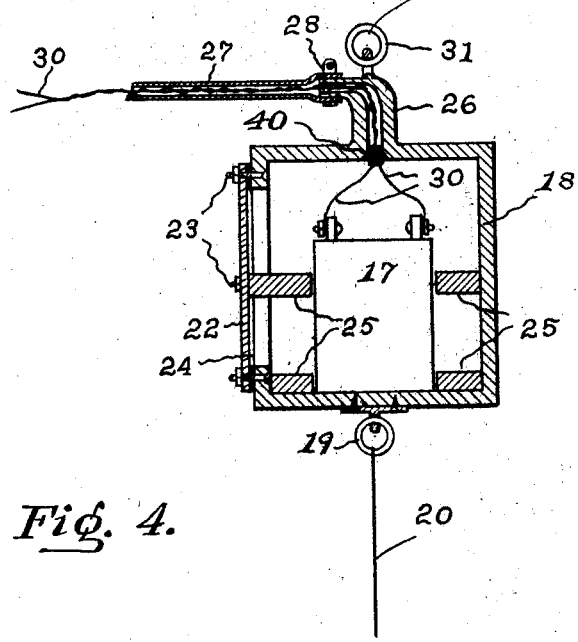
Figure 4 is an enlarged detail view of the battery receiving buoy, portions being shown in section to illustrate more clearly the details of construction.

Referring to the drawings which illustrate one particular embodiment of the invention, the numeral 1 designates the netting which forms the enclosing walls of the trap, and 2 reinforcing cables which are arranged at the corners of the trap and also extend transversely across the sides and top and bottom thereof at suitable intervals. The netting may be of any suitable mesh, depending upon the kinds of fish which are intended to be caught. The trap has an elongated formation, and the central portion 3 thereof is provided upon opposite sides thereof with tunnels 4 which form the entrances to the trap.

Side passages 5 extend laterally in opposite directions from the central portion 3 and lead to the cribs 6 and 7. Each of the side passages 5 is provided with a pair of converging winkers 8. A tunnel 9 is arranged at the entrance to each of the second cribs 6, and a similar tunnel 10 is arranged at the entrance of each of the first cribs 7. The fish enter the central portion of the trap through the entrance tunnels 4, and in their attempts to escape usually work their way through one or the other side passages 5, until they finally enter the cribs. The formation of the tunnels and winkers is such as to operate in the usual manner to facilitate the entrance of the fish into the trap and cribs and to render it difficult for the fish to escape from the trap.

The trap may be set and held in position in any suitable or well known manner. For this purpose anchors 11 may be secured to the lower portion of the trap and floats 12 may be attached to the upper portion of the trap. The usual bridles 13 are attached to the ends and sides of the trap at suitable places, and these bridles are connected by cords 14 to bridle weights 15. The exact manner of setting or anchoring the trap is immaterial to this invention, since it may be accomplished in any conventional manner within the knowledge of fishermen and persons skilled in this particular art.

For the purpose of attracting fish to the trap a luminous member such as an electric light 16 is arranged within the central portion of the trap opposite the mouths of the two entrance tunnels 4. The electric light receives its current from a suitable battery 17 which is contained within a submerged buoy 18. The battery receiving buoy has a hollow formation, so that the battery can be received therein, and the buoyancy of the buoy is more than sufficient to float the battery. The bottom of the buoy is provided with a ring 19 which is connected by a cable 20 to an anchor 21, which is sufficiently heavy to keep the buoy in a submerged position. One side of the buoy is provided with an opening through which the battery can be placed in position within the buoy or removed therefrom. The opening is normally closed by a cover plate 22, which is secured in position by means of bolts 23, a gasket 24 being inserted between the cover plate and the buoy, so that an absolutely water tight joint is obtained when the cover plate is clamped in position. If desired, suitable positioning means 25 may be provided within the buoy to keep the battery in proper place therein, and one or more of the positioning members may be carried by the cover so as to be removable therewith.

The top of the battery buoy is provided with a tubular neck 26 which is preferably curved laterally. One end of a suitable length of heavy rubber tubing 27 is fitted over the end of the neck 26 and securely fastened thereto by suitable means such as the clamp 28. This rubber tubing extends to the lamp socket 29, and the electric wires 30 which lead from the battery to the lamp extend through the rubber tube. The rubber tube has a water tight connection with the lamp socket, and the connection between the lamp and the socket is also made water tight in some suitable manner as by the use of a rubber covering and rubber gaskets, or by providing the members with a heavy coating of some substance such as wax or tar.

The neck 26 of the battery buoy is provided with a ring 31, and a stout cord 32 extends upwardly from this ring to a float 33 which is adapted to ride upon the surface of the water. The battery buoy can be submerged at any desired depth by properly adjusting the length of the cable 20 and twine 32, and when it is desired to bring the battery buoy to the surface this can be readily accomplished by pulling upwardly on the twine 32. The rubber tube 27 is of such a length that the battery buoy can be drawn to the surface and the battery removed or replaced without the necessity of disturbing the trap.

When arranging the battery 17 within the buoy 18 and connecting the wires 30 to the battery terminals, the lower end of the opening through the curved neck 26 may be closed by a suitable cork or stopper 40. The wires 30 can either pass through the stopper or be received in a notch in one side thereof. This stopper will prevent any of the fumes from the battery from entering the rubber tube 27 and will also prevent water from entering the buoy through the rubber tube and curved neck in the event the rubber tube should be cut or have a hole worn therein while the device is in use. If desired, the inner walls of the battery receiving buoy 18 can be coated with grease or some like substance to prevent corrosion or injury thereof by the fumes from the battery.

Extending longitudinally of the trap at the top and bottom thereof are reinforcing cords 34 which are known as the back-bones of the trap. A vertical cord 35 connects these back-bone cords 34 at the middle of the central compartment 3 of the trap, and the rubber tube 27 is secured by suitable fastening members 36 to the vertical cord 35, so that the lamp is held in the proper position. In order to maintain this vertical cord in a taut position one of the anchors 11 may be arranged at the lower end thereof and one of the floats 12 at the upper end thereof.

When the trap is set all of the essential parts thereof are entirely submerged so that the trap is hidden, and the battery and electric light have water tight connections and mountings so that they will function to cause the lamp to burn when the trap is in operation. The burning of the lamp will attract the fish in the well known manner, and many of the fish which are thereby attracted to the trap will enter the same through the entrance tunnels 4, and finally work themselves back into one or other of the cribs. The fish which are captured can be removed from the cribs in the manner which is well known to fishermen and those skilled in this art.

While I have illustrated and described one particular embodiment of my invention, it will be understood that many modifications and changes can be made in the details of construction without departing in any manner from the spirit of the invention and the scope of the appended claims.

Having thus described my invention what I claim as new and desire to secure by Letters Patent is—

1. A fish catching device of the character described, including a trap enclosure, an electric light associated with the trap enclosure to attract the fish, a battery, a buoy supporting the battery, and a cable connecting the battery with the light and of sufficient length to enable the battery to be replaced without disturbing the trap enclosure.

2. A fish catching device of the character described, including a trap enclosure, an electric light associated with the trap enclosure to attract the fish, a battery, a submerged buoy receiving the battery, and an operative connection between the battery and the light whereby the buoy can be lifted to the surface without disturbing the trap enclosure.

3. A fish catching device of the character described, including a trap enclosure, an electric light associated with the trap enclosure to attract the fish, a submerged battery, and a cable connecting the battery with the light and of sufficient length to enable the battery to be replaced without disturbing the trap enclosure.

4. A fish catching device of the character described, including a trap enclosure having an entrance, an electric light associated with the trap enclosure to attract the fish, a battery, a submerged buoy receiving the battery, and a cable connecting the battery to the light, said cable being of sufficient length to enable the battery to be lifted to the surface without disturbing the trap enclosure.

5. A fish catching device of the character described, including a trap enclosure having an entrance, an electric light associated with the enclosure to attract the fish, a battery, a hollow submergible buoy receiving the battery, an anchor connected to the battery receiving buoy to keep it submerged, means for lifting the buoy, and a cable connecting the battery to the electric light, said cable being of sufficient length to enable the battery receiving buoy to be lifted to the surface without disturbing the trap enclosure.

6. A fish catching device of the character described, including a trap enclosure having an entrance, an electric light associated with the trap enclosure to attract the fish, a hollow submergible buoy having an opening in one side thereof, a battery adapted to be inserted in the buoy through the said opening, a water tight closure for the opening, a cable connecting the battery to the electric light and being of a sufficient length to enable the submergible buoy to be lifted to the surface without disturbing the trap enclosure, means for submerging the buoy, and means for lifting the buoy to the surface.

7. A fish catching device of the character described, including a trap enclosure having an entrance, an electric light associated with the trap enclosure to attract the fish, a hollow battery receiving buoy provided with a tubular neck, a battery within the buoy, a water tight tube connected to the tubular neck and extending to the electric light, and electric wires connecting the light and the battery and extending through the said tube.

In testimony whereof I affix my signature.

WILLIAM E. SHEPHERD.